(12) United States Patent
Kim et al.

(10) Patent No.: US 10,303,468 B2
(45) Date of Patent: May 28, 2019

(54) REAL-TIME QUALITY OF SERVICE MONITORING APPARATUS AND METHOD

(71) Applicant: ELECTRONICS AND TELECOMMUNICATIONS RESEARCH INSTITUTE, Daejeon (KR)

(72) Inventors: Young-Joo Kim, Daejeon (KR); Yung Joon Jung, Daejeon (KR); Jeong-Si Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 277 days.

(21) Appl. No.: 15/219,549

(22) Filed: Jul. 26, 2016

(65) Prior Publication Data
US 2017/0257287 A1    Sep. 7, 2017

(30) Foreign Application Priority Data

Mar. 3, 2016  (KR) ......................... 10-2016-0025842

(51) Int. Cl.
*G06F 15/16* (2006.01)
*G06F 8/75* (2018.01)
(Continued)

(52) U.S. Cl.
CPC .................. *G06F 8/75* (2013.01); *G06F 8/30* (2013.01); *G06F 8/41* (2013.01); *G06F 11/34* (2013.01);
(Continued)

(58) Field of Classification Search
CPC ..... G06F 8/75; G06F 8/41; G06F 8/30; G06F 11/3636; G06F 11/3612; G06F 11/34
(Continued)

(56) References Cited

U.S. PATENT DOCUMENTS

| 6,721,941 B1 * | 4/2004 | Morshed ............. G06F 11/3612 709/217 |
| 2005/0273757 A1 * | 12/2005 | Anderson ................ G06F 8/75 717/100 |

(Continued)

FOREIGN PATENT DOCUMENTS

| KR | 10-2004-0066579 A | 7/2004 |
| KR | 10-2007-0106024 A | 10/2007 |

(Continued)

*Primary Examiner* — Kyung H Shin
(74) *Attorney, Agent, or Firm* — NSIP Law

(57) ABSTRACT

Provided herein is a real-time QoS monitoring apparatus, including an application registration unit configured to register at least one monitoring target application program for QoS measurement; a function explorer unit configured to detect user-defined functions in application code of the at least one monitoring target application program; a loop-statement explorer unit configured to detect loop-statements in the application code; a user-defined location explorer unit configured to detect user-defined locations in the application code; and a heartbeat generator configured to generate a plurality of heartbeat calls to correspond to the functions detected by the function finder, the loop-statements detected by the loop finder, and the user-defined locations detected by the user-defined location finder. Accordingly, there are provided a real-time QoS monitoring apparatus and method, which may measure QoS in real time without additionally modifying the application program.

17 Claims, 5 Drawing Sheets

(51) Int. Cl.
*H04L 12/24* (2006.01)
*H04L 12/26* (2006.01)
*G06F 11/36* (2006.01)
*G06F 8/30* (2018.01)
*G06F 8/41* (2018.01)
*G06F 11/34* (2006.01)

(52) U.S. Cl.
CPC ...... *G06F 11/3612* (2013.01); *G06F 11/3636* (2013.01); *H04L 41/5038* (2013.01); *H04L 43/0817* (2013.01); *H04L 43/10* (2013.01)

(58) Field of Classification Search
USPC ........................................................ 709/217
See application file for complete search history.

(56) References Cited

U.S. PATENT DOCUMENTS

| 2008/0080534 | A1 | 4/2008 | Lee et al. |
| 2015/0149982 | A1* | 5/2015 | Shoham ................... G06F 8/30 717/106 |
| 2015/0370546 | A1 | 12/2015 | Kim et al. |

FOREIGN PATENT DOCUMENTS

| KR | 10-0934866 B1 | 12/2009 |
| KR | 10-2011-0022705 A | 3/2011 |
| WO | WO 2006/097899 A1 | 9/2006 |
| WO | WO 2008/008990 A2 | 1/2008 |

* cited by examiner

REAL-TIME QUALITY OF SERVICE MONITORING APPARATUS AND METHOD

CROSS-REFERENCE TO RELATED APPLICATION

The present application claims priority to Korean patent application number 10-2016-0025842 filed on Mar. 3, 2016 the entire disclosure of which is incorporated herein in its entirety by reference.

BACKGROUND

Field of Invention

Various embodiments of the present disclosure relate to a real-time Quality of Service (QoS) monitoring apparatus and method, which may monitor in real time the QoS of an application program running on an arbitrary system.

Description of Related Art

Companies in which multicore smart phones are produced have a tendency to perform parallel programming only for an application program that enables parallelism so as to improve multicore-based performance, but there are few attempts to improve performance at the level of an Operating System (OS), and the commercialization of technology is scarcely realized. Further, in academic fields, research into self-adaptive software (SW) has recently been conducted, but the fields of research are very restrictive. Self-adaptive software has been chiefly studied in x86-based devices for research purposes, rather than being developed for embedded devices.

In order to optimize application programs, the measurement of the Quality of Service (QoS) of application programs should be preceded. Conventional monitoring methods use a scheme for measuring QoS information generated during the execution of an application program by inserting monitoring code into the application program. Due thereto, such a conventional monitoring method is limited in the aspect of utilization.

SUMMARY

Various embodiments of the present disclosure are directed to a real-time QoS monitoring apparatus and method, which may measure QoS in real time upon executing an application program without additionally modifying the application program.

Furthermore, various embodiments of the present disclosure are directed to a real-time QoS monitoring apparatus and method, which may support the optimization of an application program using QoS that is measured in real time.

One embodiment of the present disclosure provides a monitoring apparatus comprises an application registration unit to register at least one self-adaptive application for measuring QoS (Quality of Service); a function explorer unit to detect user-defined functions in application code of the at least one self-adaptive application; a loop-statement explorer unit to detect loop-statements in the application code; a user-defined location explorer unit to detect user-defined locations marked by a user in the application codes; and a QoS generation unit to measure the QoS corresponding to the user-defined functions, the loop-statements and the user-defined locations detected in the application code.

Further, the loop-statements include at least one of for-loop, do-loop and while-loop.

Furthermore, the QoS including heartbeat information.

Furthermore, the user-defined locations are line numbers of the application code.

Furthermore, the QoS generation unit generates heartbeat calls correspond to entry times and exit times of the detected user-defined functions.

Furthermore, the QoS generation unit generates heartbeat calls to correspond to entry times of the detected loops.

Furthermore, the QoS generation unit calculates QoS information using the heartbeat calls.

Furthermore, the QoS information includes a time difference between an i-th heartbeat call (where i is a natural number of 2 or more) and an i−1-th heartbeat call.

Furthermore, the QoS information includes a number of heartbeat calls generated during each unit period.

Furthermore, the QoS information includes an average value of time differences between heartbeat calls generated during each unit period.

Furthermore, the QoS information includes an average value of time differences between heartbeat calls generated during an entire period.

Furthermore, the QoS generation unit generates heartbeat calls to correspond to the detected user-defined locations.

Meanwhile, a monitoring method according to an embodiment of the present disclosure comprises registering at least one self-adaptive application for measuring QoS (Quality of Service); detecting user-defined functions, loop-statements, and user-defined locations included in application code of the at least one self-adaptive application; and measuring QoS to correspond to the QoS corresponding to the user-defined functions, the loop-statements and the user-defined locations detected in the application code.

Furthermore, the loop-statements include at least one of for-loop, do-loop and while-loop.

Furthermore, the measuring the QoS comprises generating heartbeat calls to correspond to entry and exit times of the detected functions, and generating heartbeat calls to correspond to entry times of the detected loops.

In addition, a monitoring method according to an embodiment of the present disclosure further comprises calculating QoS information using heartbeat calls generated at the measuring the QoS.

Furthermore, the QoS information includes at least one of a time difference between an i-th heartbeat call (where i is a natural number of 2 or more) and an i−1-th heartbeat call, a number of heartbeat calls generated during each unit period, an average value of time differences between heartbeat calls generated during each unit period, and an average value of time differences between heartbeat calls generated during an entire period.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
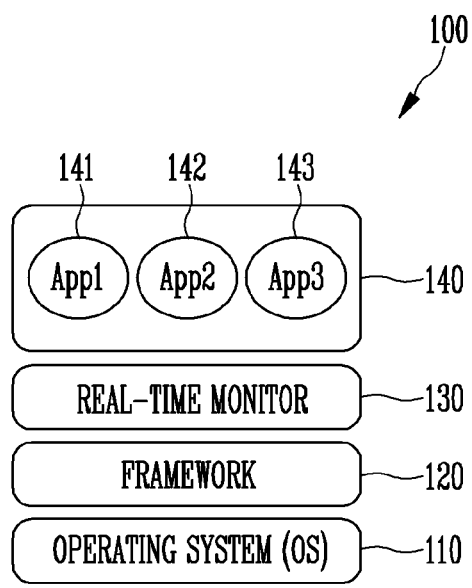
FIG. 1 is a diagram showing the system environment of a real-time QoS monitoring apparatus according to an embodiment of the present disclosure.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Hereinafter, a real-time QoS monitoring apparatus and method according to an embodiment of the present disclosure will be described in detail with reference to embodiments of the present disclosure and drawings for describing the embodiments.

FIG. 1 is a diagram showing the system environment of a real-time QoS monitoring apparatus according to an embodiment of the present disclosure.

Referring to FIG. 1, a real-time QoS monitoring apparatus 100 according to an embodiment of the present disclosure may include an Operating System (OS) 110, a framework 120 supporting binary instrumentation, a real-time monitor 130, and a plurality of application programs 140.

The OS 110 may run on an arbitrary system and may be, for example, a Linux-based OS.

For example, an environment should be made in which a Low Level Virtual Machine (LLVM) that supports easy implementation of optimization regardless of a programming language in a compile time, link time, or runtime situation, or a PIN tool that is an executable file analyzer created by Intel may be used.

LLVM generates a virtual machine in a language and realizes optimization in which the generated virtual machine is language-independent. LLVM is independent of a language and a structure, and uses a Just In Time (JIT) compiler as a static compiler along with the performance of optimization during a compilation process while being interposed between a language module and a code generation unit for systems. Thus, LLVM has many parts that may be used in various types of development steps. LLVM may statically compile code as in a typical GNU Compiler Collection (GCC) system, or may compile code in an intermediate format which will be compiled once more into machine code using JIT as in the case of Java. That is, it does not mean that LLVM is independent of a platform, as in the case of Java.

Further, PIN is a dynamic binary analysis tool provided by Intel, and is capable of inserting arbitrary code written in C or C++ language as a part of executable code. PIN is a program which does not require recompilation of source code and which dynamically recompiles code. PIN is a kind of JIT compiler, which intercepts the flow of execution of an instruction whenever a single instruction is executed, and which internally executes newly compiled code in the PIN. At this time, the instrumentation of code desired by a user may be performed.

By using this framework 120, the real-time monitor 130 may monitor the QoS of each application program in real time.

For example, the real-time monitor 130 may monitor the plurality of application programs 140. A monitoring method performed by the real-time monitor 130 is to monitor a part desired by a developer or a user when a binary-format program is executed rather than inserting monitoring code in the code of an application program. That is, the real-time monitor 130 proposed in the present patent may measure QoS in real time without additionally modifying the application programs.

The real-time QoS monitoring apparatus 100 may execute the plurality of application programs 140.

For example, application programs 140 may include a first application program 141, a second application program 142, and a third application program 143. In FIG. 1, although the case where three application programs 141, 142, and 143 are present has been illustrated, the number of application programs that are executed on the real-time QoS monitoring apparatus 100 may be variously changed.

Figure 2:
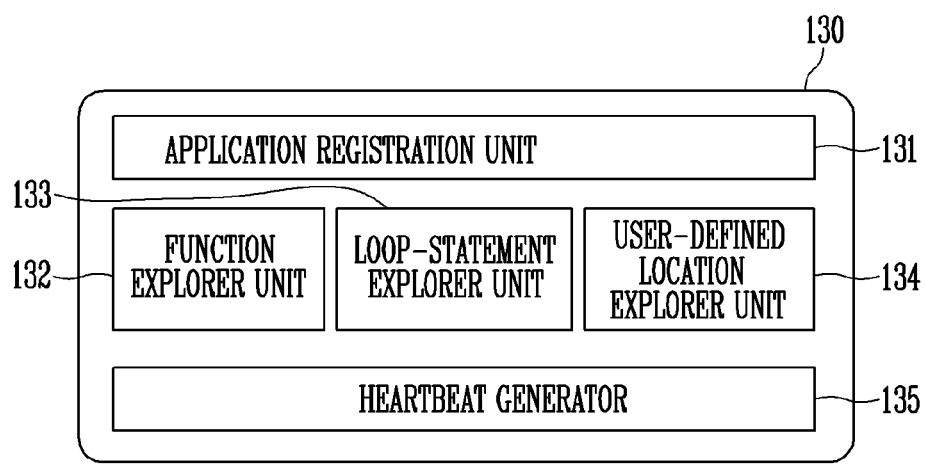
FIG. 2 is a diagram showing a real-time monitor according to an embodiment of the present disclosure.

FIG. 2 is a diagram showing a real-time monitor according to an embodiment of the present disclosure.

Referring to FIG. 2, the real-time monitor 130 according to an embodiment of the present disclosure may include an application registration unit 131, a function explorer unit 132, a loop-statement explorer unit 133, a user-defined location explorer unit 134, and a heartbeat generator 135.

The application registration unit 131 may select at least one of the plurality of application programs 141, 142, and 143 that are currently being executed as a monitoring target, and may register the selected application program as a monitoring target application program. Here, the at least registered monitoring target application program acts as a self-adaptive application. Further, the application registration unit 131 may be referred to as an "application launcher").

Here, the number of monitoring target application programs may be variously changed, but as the number of portions to be monitored is larger, the application programs may be further influenced, and thus the number of monitoring targets should be adjusted suitably.

Below, the case where, among the application programs 141, 142, and 143, the first application program 141 is registered as a monitoring target application program will be described by way of example.

The function explorer unit 132 may detect functions present in the application program 141 registered as the monitoring target, and the loop-statement explorer unit 133 may detect loop-statements (e.g. for-loop, while-loop, do-while-loop, etc.) present in the application program 141 that is registered as the monitoring target. The function explorer unit 132 and the loop-statement explorer unit 133 may detect user-defined functions and loop-statements in the code of the application program registered as the monitoring target.

Further, the user-defined location explorer unit 134 may detect user-defined locations present in the application program 141 registered as the monitoring target. The user-defined location explorer unit 134 may detect user-defined locations marked by the user in the code of the application program registered as the monitoring target.

For example, the user-defined location explorer unit 134 may receive a code line or a function name personally designated by the user and may find the location thereof.

The heartbeat generator 135 may generate QoS information for points, detected by the function, loop, and user-defined location finders 132, 133, and 134, in real time. In various embodiments, the heartbeat generator 135 may be designated as a "QoS generation unit".

The QoS information is chiefly related to time measurement and a system tick, and may use heartbeat information or include heartbeat information, as will be described later.

For example, the heartbeat generator 135 may mainly provide two types of QoS information. One is the measurement of QoS for each section, and the other is the measurement of QoS for an arbitrary point. That is, the measurement of QoS for each section means a function-unit measurement, and the measurement of QoS for an arbitrary point means the measurement of a loop or an arbitrary code point (e.g. user-defined location).

Figure 3:
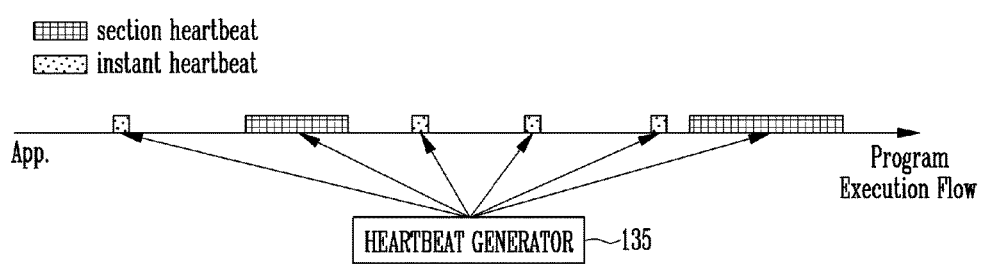
FIG. 3 is a diagram showing a QoS measurement operation performed by a heartbeat generator according to an embodiment of the present disclosure.

FIG. 3 is a diagram showing a QoS measurement operation performed by the heartbeat generator according to an embodiment of the present disclosure.

Referring to FIG. 3, the heartbeat generator 135 may provide a section heartbeat and an instant heartbeat.

When an arbitrary program is executed, a developer or a user may wonder the level of performance and the speed at which functions or loop-statements in the program are executed.

Therefore, the heartbeat generator 135 may provide QoS obtained by measuring times at which the entry and exit of each function are made through the section heartbeat, and may provide QoS obtained by measuring a time at which the entry of a loop is made or a point at which arbitrary code is executed through the instant heartbeat.

As shown in FIG. 3, the section heartbeat has the meaning of a section, and the instant heartbeat has the meaning of a time (or a point in time).

Figure 4A:
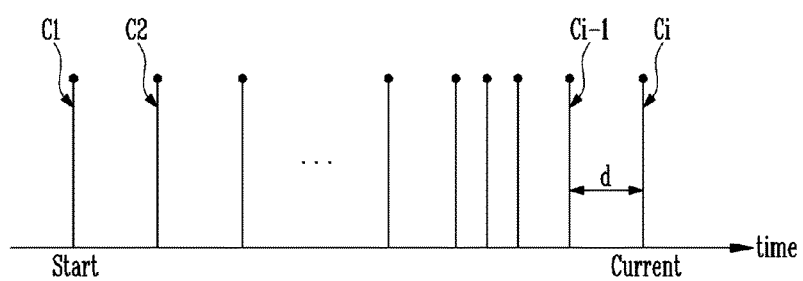
FIGS. 4A to 4C are diagrams showing QoS information provided by the heartbeat generator according to an embodiment of the present disclosure.
Figure 4B:
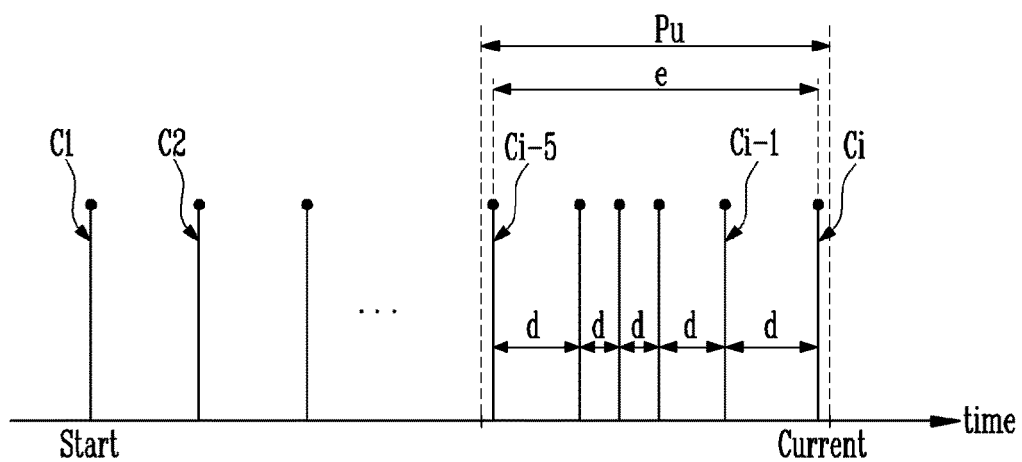
Figure 4C:
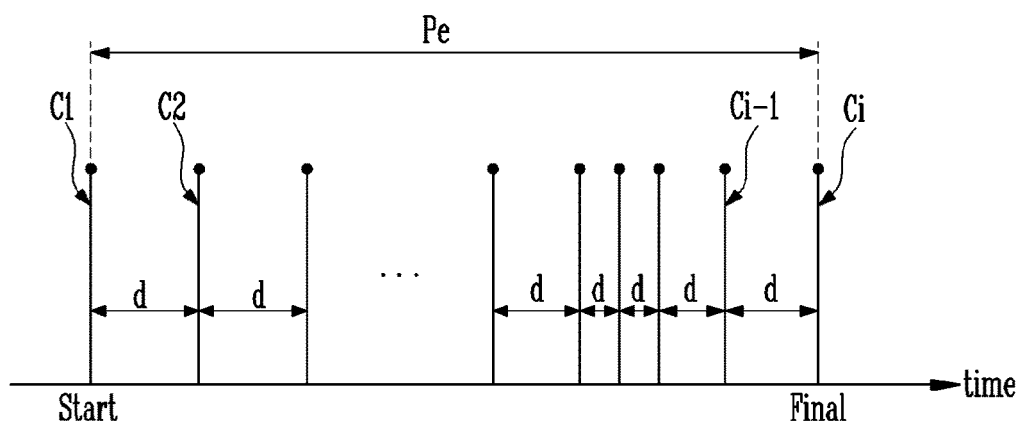

FIGS. 4A to 4C are diagrams showing QoS information provided by the heartbeat generator according to an embodiment of the present disclosure.

Referring to FIG. 4A, the heartbeat generator 135 may generate a plurality of heartbeat calls C1 to Ci so as to calculate QoS information.

More specifically, the heartbeat generator 135 may generate a plurality of heartbeat calls C1 to Ci to correspond to the functions detected by the function explorer unit 132, the loop-statements found by the loop-statement explorer unit 133, and user-defined locations found by the user-defined location explorer unit 134.

For example, the heartbeat generator 135 may generate heartbeat calls to correspond to the entry and exit times of the corresponding function, respectively. Further, the heartbeat generator 135 may generate heartbeat calls to correspond to the entry times of loops, and the user-defined location explorer unit 134 may generate heartbeat calls to correspond to arbitrary code points defined by the user.

The heartbeat generator 135 may calculate QoS information using at least some of the heartbeat calls C1 to Ci.

For example, the QoS information may include a time difference between two neighboring heartbeat calls.

As shown in FIG. 4A, a time difference d between an i-th heartbeat call Ci and an i−1-th heartbeat call Ci−1 may denote QoS information indicative of the performance of the monitoring target application program 141, where i means a natural number of 2 or more.

For example, when a specific loop included in the monitoring target application program 141 is initiated, the current heartbeat call Ci may be generated. At this time, a time difference from a previous heartbeat call Ci−1 may be utilized as QoS information.

Referring to FIG. 4B, the heartbeat generator 135 may calculate QoS information using heartbeat calls Ci−5 to Ci generated during a preset unit period Pu.

For example, the QoS information may include the number of heartbeat calls Ci−5 to Ci included in the unit period Pu.

That is, in FIG. 4B, six heartbeat calls Ci−5 to Ci are generated during the unit period Pu, and thus "6" may be utilized as QoS information.

Further, the QoS information may include the average value of time differences d between the heartbeat calls Ci−5 to Ci included in the unit period Pu.

Depending on the monitoring target application program 141, the time differences d between the neighboring heartbeat calls may differ from each other, and all of the differences d present between the heartbeat calls Ci−5 to Ci are summed up and are averaged, and then the average thereof may be utilized as QoS information.

This may be calculated using another method. For example, QoS information may be calculated by dividing a time difference e between an initial heartbeat call Ci−5 and a final heartbeat call Ci in the unit period Pu by a value (e.g. "5" in FIG. 4B), which is obtained by subtracting 1 from the number of heartbeat calls Ci−5 to Ci (e.g. "6" in FIG. 4B) generated during the unit period Pu.

Here, the unit period Pu may be changed in various manners by the developer or the user.

Referring to FIG. 4C, the heartbeat generator 135 may calculate QoS information using the heartbeat calls C1 to Ci generated during the entire period Pe.

For example, the QoS information may include the average value of time differences d between the heartbeat calls C1 to Ci included in the entire period Pe.

Depending on the monitoring target application program 141, the time differences d between neighboring heartbeat calls may differ from each other, and all of the time differences d between the heartbeat calls C1 to Ci are summed up and are averaged, and then the average thereof may be utilized as QoS information.

This may be calculated using another method. For example, QoS information may be calculated by dividing the time difference between an initial heartbeat call C1 and a final heartbeat call Ci in the entire period Pe by a value (e.g. "i−1" in FIG. 4C), which is obtained by subtracting 1 from the number of heartbeat calls C1 to Ci (e.g. "i" in FIG. 4C) generated during the entire period Pe.

Figure 5:
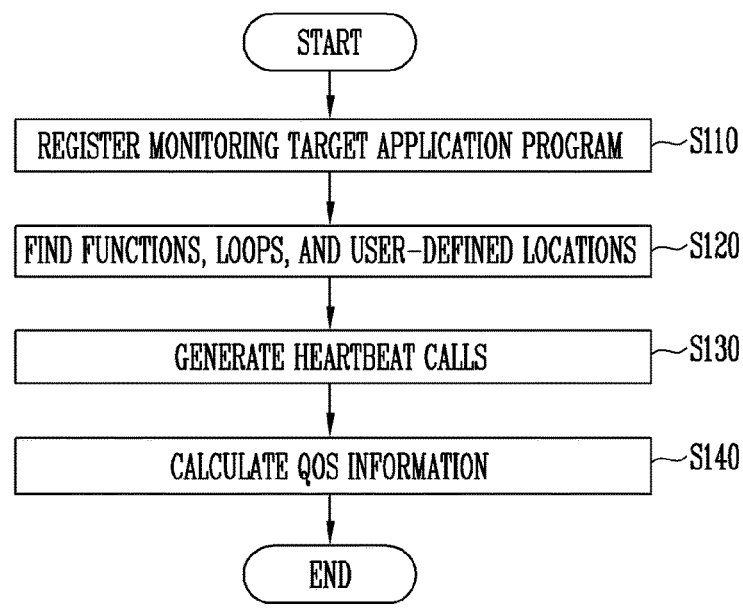
FIG. 5 is a flowchart showing a real-time QoS monitoring method according to an embodiment of the present disclosure.

FIG. 5 is a flowchart showing a real-time QoS monitoring method according to an embodiment of the present disclosure.

Referring to FIG. 5, the real-time QoS monitoring method according to the embodiment of the present disclosure may include a monitoring target application program registration step S110, a function, loop, and user-defined location detection step S120, a heartbeat call generation step S130, and a QoS information calculation step S140.

Hereinafter, individual steps of the method will be described in detail with reference to above descriptions related to FIGS. 1 to 4C.

At the monitoring target application program registration step S110, at least one of the plurality of application programs 141, 142, and 143 may be registered as a monitoring target application program.

This step S110 may be performed by the above-described application registration unit 131.

Below, the case where, among the application programs 141, 142, and 143, the first application program 141 is registered as the monitoring target application program will be described by way of example.

At the function, loop, and user-defined location detection step S120, functions, loops, and user-defined locations, which are included in the monitoring target application program 141, may be detected.

At this step S120, the detection of functions may be performed by the above-described function explorer unit 132, and the detection of loops, such as a for-loop and a while-loop, may be performed by the above-described loop-statement explorer unit 133. Also, at step S120, the detection of arbitrary code points defined by the user may be performed by the above-described user-defined location explorer unit 134.

At the heartbeat call generation step S130, a plurality of heartbeat calls C1 to Ci may be generated to correspond to the functions, loops, and user-defined locations detected at the function, loop, and user-defined location detection step S120.

For example, at this step S130, heartbeat calls may be generated to correspond to the entry and exit times of the functions detected at the previous step S120, and heartbeat calls may be generated to correspond to the entry times of the loop-statements detected at the previous step S120.

Further, at this step S130, heartbeat calls may be generated to correspond to the user-defined locations (e.g. code line or function name) detected at the previous step S120.

At the QoS information calculation step S140, QoS information may be calculated using the heartbeat calls C1 to Ci generated at the heartbeat call generation step S130.

For example, the QoS information may include at least one of a time difference d between an i-th heartbeat call Ci and an i−1-th heartbeat call Ci−1, the number of heartbeat calls Ci−5 to Ci included in a unit period Pu, the average value of the time differences d between heartbeat calls Ci−5 to Ci included in the unit period Pu, and the average value of the time differences d between the heartbeat calls C1 to Ci included in the entire period Pe.

The heartbeat call generation step S130 and the QoS information calculation step S140 may be performed by the above-described heartbeat generator 135.

Figure 6:
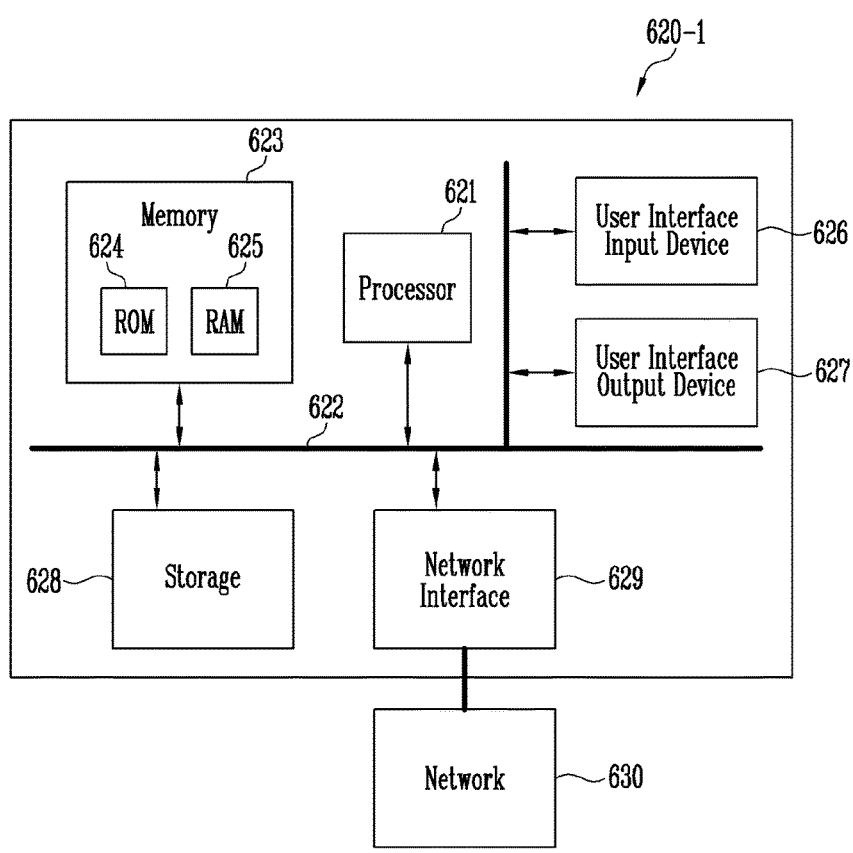
FIG. 6 is a block diagram of a computer system according to an embodiment of the present invention.

An embodiment of the present invention may be implemented in a computer system, e.g., as a computer readable medium. As shown in FIG. 6, a computer system 620-1 may include one or more of a processor 621, a memory 623, a user input device 626, a user output device 627, and a storage 628, each of which communicates through a bus 622. The computer system 620-1 may also include a network interface 629 that is coupled to a network 630. The processor 621 may be a central processing unit (CPU) or a semiconductor device that executes processing instructions stored in the memory 623 and/or the storage 628. The memory 623 and the storage 628 may include various forms of volatile or non-volatile storage media. For example, the memory may include a read-only memory (ROM) 624 and a random access memory (RAM) 625.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

In accordance with the above-described present disclosure, there can be provided the real-time QoS monitoring apparatus and method, which may measure QoS in real time without additionally modifying application programs, thus measuring QoS even for any arbitrary program.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A monitoring apparatus comprises:
    an application registration unit to register at least one self-adaptive application for measuring QoS(Quality of Service);
    a function explorer unit to detect user-defined functions in application code of the at least one self-adaptive application;
    a loop-statement explorer unit to detect loop-statements in the application code;
    a user-defined location explorer unit to detect user-defined locations marked by a user in the application codes; and a QoS generation unit to measure the QoS corresponding to the user-defined functions, the loop-statements and the user-defined locations detected in the application code,
wherein the QoS generation unit measures a first QoS which is an average value during an entire period, a second QoS which is an average value during a preset unit period, and a third QoS which is a real-time value at an arbitrary point.

2. The monitoring apparatus of claim 1, wherein the loop-statements include at least one of for-loop, do-loop and while-loop.

3. The monitoring apparatus of claim 1, wherein the QoS including heartbeat information.

4. The monitoring apparatus of claim 1, wherein the user-defined locations are line numbers of the application code.

5. The monitoring apparatus according to claim 1, wherein the QoS generation unit generates heartbeat calls correspond to entry times and exit times of the detected user-defined functions.

6. The monitoring apparatus according to claim 1, wherein the QoS generation unit generates heartbeat calls to correspond to entry times of the detected loops.

7. The monitoring apparatus according to claim 1, wherein the QoS generation unit calculates QoS information using the heartbeat calls.

8. The monitoring apparatus according to claim 7, wherein the QoS information includes a time difference between an i-th heartbeat call (where i is a natural number of 2 or more) and an i−1-th heartbeat call.

9. The monitoring apparatus according to claim 7, wherein the QoS information includes a number of heartbeat calls generated during each unit period.

10. The monitoring apparatus according to claim 7, wherein the QoS information includes an average value of time differences between heartbeat calls generated during each unit period.

11. The monitoring apparatus according to claim 7, wherein the QoS information includes an average value of time differences between heartbeat calls generated during an entire period.

12. The QoS monitoring apparatus according to claim 1, wherein the QoS generation unit generates heartbeat calls to correspond to the detected user-defined locations.

13. A monitoring method, comprising:
registering at least one self-adaptive application for measuring QoS(Quality of Service);
detecting user-defined functions, loop-statements, and user-defined locations included in application code of the at least one self-adaptive application; and
measuring QoS to correspond to the QoS corresponding to the user-defined functions, the loop-statements and the user-defined locations detected in the application code,
wherein the measuring of the QoS comprises measuring a first QoS which is an average value during an entire period, a second QoS which is an average value during a preset unit period, and a third QoS which is a real-time value at an arbitrary point.

14. The QoS monitoring method according to claim 13, wherein the loop-statements include at least one of for-loop, do-loop and while-loop.

15. The QoS monitoring method according to claim 13, wherein the measuring the QoS comprises generating heartbeat calls to correspond to entry and exit times of the detected functions, and generating heartbeat calls to correspond to entry times of the detected loops.

16. The QoS monitoring method of claim 13, further comprising:
calculating QoS information using heartbeat calls generated at the measuring the QoS.

17. The QoS monitoring method according to claim 16, wherein the QoS information includes at least one of a time difference between an i-th heartbeat call (where i is a natural number of 2 or more) and an i−1-th heartbeat call, a number of heartbeat calls generated during each unit period, an average value of time differences between heartbeat calls generated during each unit period, and an average value of time differences between heartbeat calls generated during an entire period.

* * * * *